P. L. FORTIN.
MANURE SPREADER FOR WAGONS.
APPLICATION FILED APR. 5, 1910.
971,837.
Patented Oct. 4, 1910.
3 SHEETS—SHEET 1.
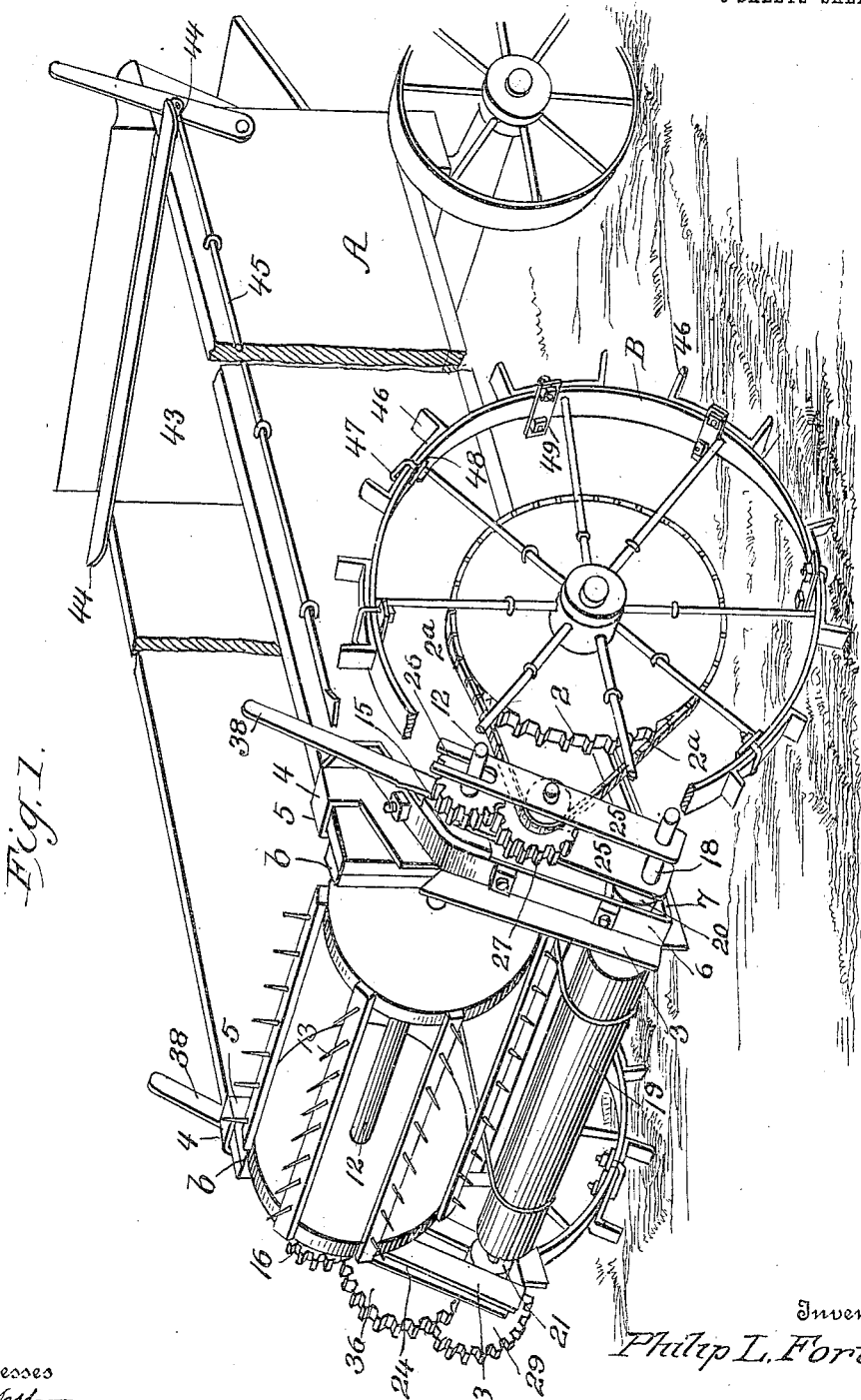
Inventor
Philip L. Fortin P. L. FORTIN.
MANURE SPREADER FOR WAGONS.
APPLICATION FILED APR. 5, 1910.
971,837.
Patented Oct. 4, 1910.
3 SHEETS—SHEET 2.
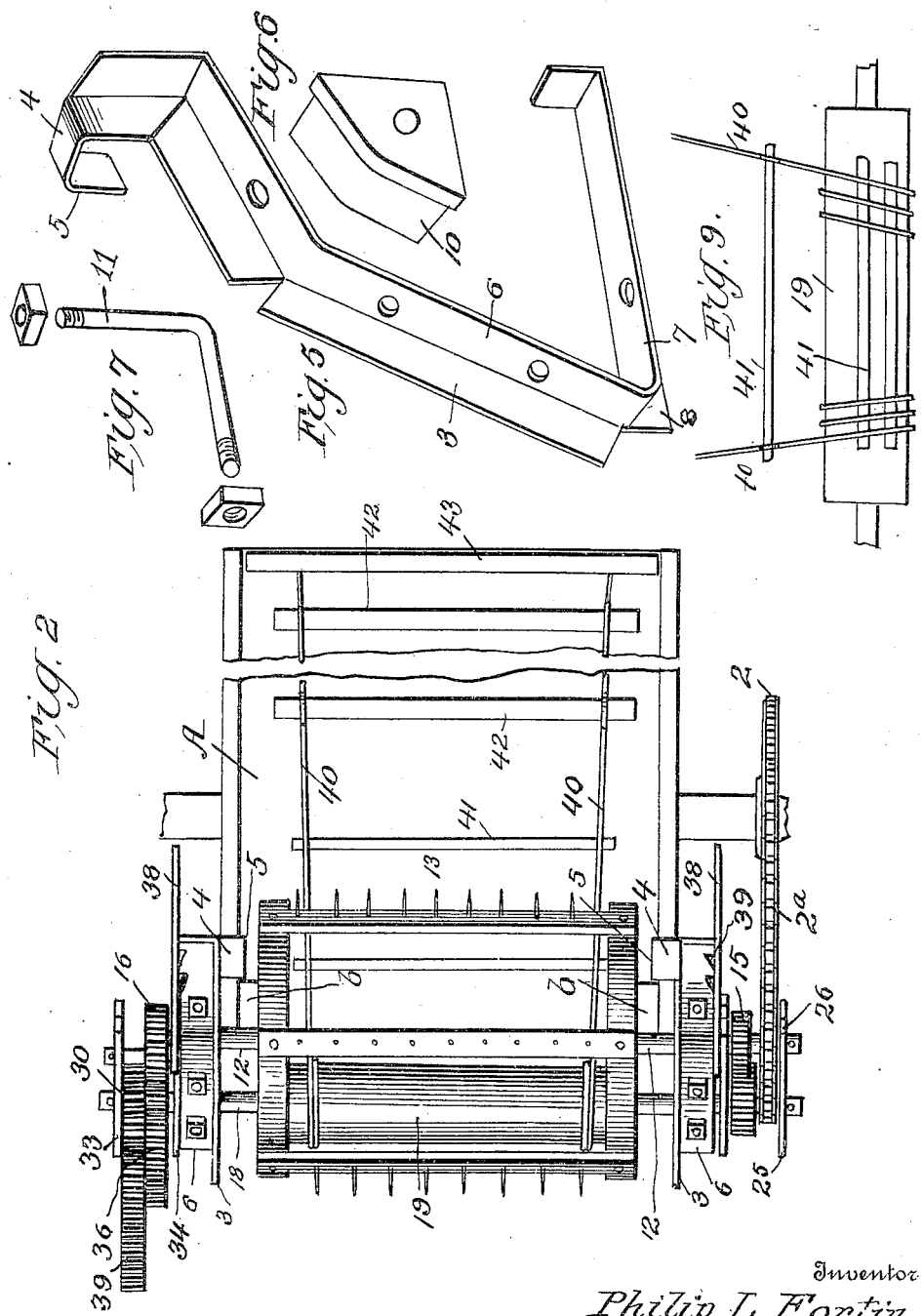
Inventor
Philip L. Fortin
Witnesses
By
Attorneys P. L. FORTIN.
MANURE SPREADER FOR WAGONS.
APPLICATION FILED APR. 5, 1910.
971,837.
Patented Oct. 4, 1910.
3 SHEETS—SHEET 3.
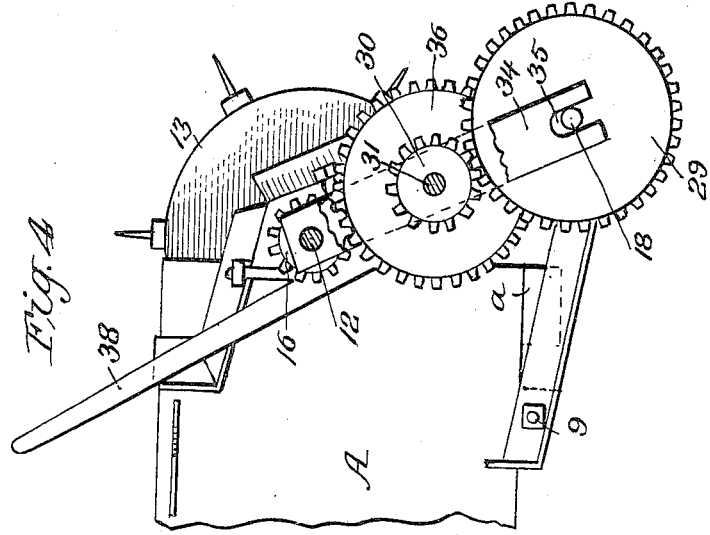
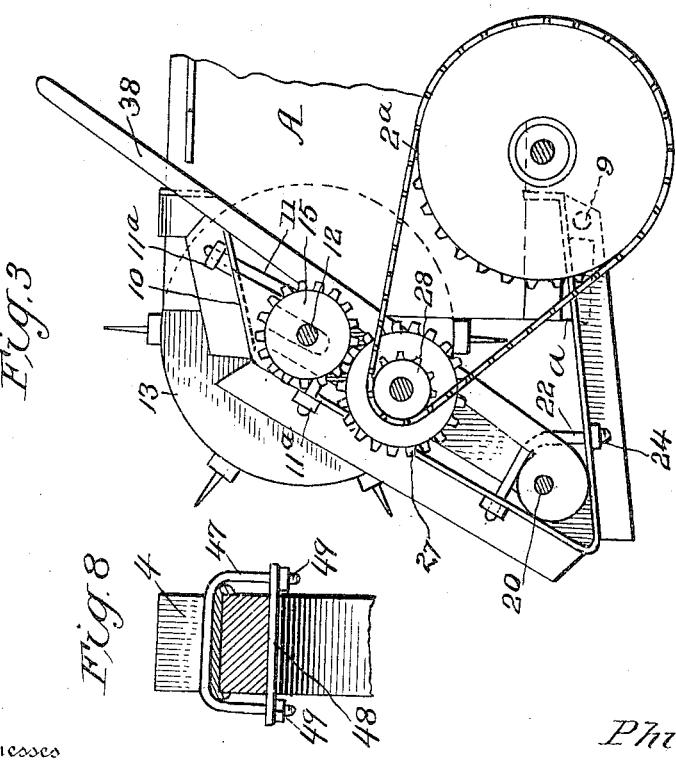
Witnesses
Inventor
Philip L. Fortin
By
Attorneys

UNITED STATES PATENT OFFICE.

PHILIP L. FORTIN, OF CLYDE, KANSAS.

MANURE-SPREADER FOR WAGONS.

971,837.     Specification of Letters Patent.     Patented Oct. 4, 1910.

Application filed April 5, 1910. Serial No. 553,634.

*To all whom it may concern:*

Be it known that I, PHILIP L. FORTIN, citizen of the United States, residing at Clyde, in the county of Cloud and State of Kansas, have invented certain new and useful Improvements in Manure-Spreaders for Wagons, of which the following is a specification.

My invention relates to devices attachable to a wagon for the purpose of spreading or distributing manure or other materials therefrom, and particularly to certain improvements upon the manure spreader illustrated and described in my pending application Serial No. 497,395, filed on the 21st day of May, 1909.

The object of my present invention is to simplify the construction shown in my aforesaid pending application and to provide simple means for disconnecting the beater shaft and the reel shaft from the driving mechanism.

It is also an object of my invention to provide a distributing mechanism which may be attached to the rear end of any ordinary farm wagon and which will thus not require a wagon to be specially built for the purpose.

My invention is shown in the accompanying drawings, wherein:

Figure 1 is a perspective view of my device applied to a wagon; Fig. 2 is a plan view thereof; Fig. 3 is a side elevation of one side thereof; Fig. 4 is a side elevation of the other side thereof; Fig. 5 is a perspective view of one of the side frames detached; Fig. 6 is a perspective view of the filling block therefor; Fig. 7 is a perspective view of the bolt for holding the filling block in place; and, Fig. 8 is a detail section of the wheel, showing the detachable tooth therefor. Fig. 9 is a detail plan view showing the conveyer being wound upon the reel.

Corresponding and like parts are referred to in the following description and indicated in all the views of the drawings by the same reference characters.

Referring to these figures, A designates the box of a wagon of any ordinary or approved description and provided with the traction wheels B, as shown. One of the rear traction wheels B is provided with the sprocket gear 2 from which extends a driving sprocket chain 2ª, this chain being connected to the operating mechanism of my distributer as will be hereinafter stated.

My distributing mechanism comprises the side frames 3 which are formed of angle iron. The upper end of each of the angle irons is inwardly turned, as at 4, and downwardly bent, as at 5, so as to engage over the upper edges of the side boards of the wagon. Each angle iron extends downward and rearward at a relatively obtuse angle to the upper edge of the board, and is then bent downward at a sharp angle, as at 6, to a point about level with the bottom of the wagon, then is bent sharply, as at 7, so that the flange 8 of the angle iron may extend slightly below the bottom of the wagon. The lower flanges 8 of these angle iron side frames are connected by a removable bolt 9, which when the device is in position upon a wagon, passes beneath the bottom of the wagon just forward of the rear brace *a*. It will thus be seen that these oppositely disposed frames, when in place upon the wagon, are rigidly held thereon by the bolt 9, and the hook shaped upper end of each of the side frames extending down rearward in front of the guide bars *b* of the wagon sides. It will be seen that by removing the bolt 9, however, the side frames may be easily removed from the wagon body.

Each of the side frames is provided at the upper end of the portion 6 with the filling block 10, each filling block being held in place by a U-shaped bolt or iron 11, having nuts 11ª whereby it may be tightened. Passing through the blocks 10 and supported therein as in bearings, is the shaft 12 upon which is mounted the beater 13 of any usual description and having projecting therefrom the pins 14. This beater, of course, acts as a distributer for the material and in its rotation throws the material from the wagon as is usual in this class of devices. Mounted upon one end of the distributer shaft 2 is the gear wheel 15 and upon the other end of the distributer shaft is the gear wheel 16, these gear wheels being fast on the shaft.

Extending across the lower portions of the side frames is the shaft 18 on which the reel 19 is mounted. The shaft 18 on each side of the reel is provided with the eccentrics 20 and 21. Curved bolts 22 pass over these eccentrics and extend through the flanges of the angle iron 3, being held in place by nuts 24. The angle of the irons 3 and the curved bolts 22 thus form bearings through which the eccentrics 20 and 21 operate.

Mounted on one end of the shaft 18 beyond the side frame 3 are the spaced upwardly extending supporting bars 25. The upper ends of these bars are vertically slotted, as at 26, and the extremity of the shaft 12 extends into these slots. It will thus be seen that these supporting bars 25 can move vertically without affecting the shaft 12. Mounted between the bars 25 is the gear wheel 27 which has connected therewith or attached thereto a sprocket wheel 28 over which the sprocket chain from the traction sprocket wheel passes. The gear wheel 27 meshes with the gear wheel 15 on the shaft 12, when the shaft 18 has been raised relatively to the shaft 12. When, however, the shaft 18 is lowered by rotating the eccentrics 20 and 21, then the gear 27 is disengaged from the gear 15 and hence the distributer shaft will no longer be driven from the gear 27.

In order to communicate motion to the winding or reel shaft 18, I provide the extremity of the shaft 18 with a gear wheel 29 of relatively large proportions which meshes with a pinion 30 mounted on the shaft 31 which passes through the supporting bars 33 and 34. The shaft 18 passes through slots 35 in the lower ends of these bars, while the shaft 12 passes through bearings in the upper ends of these bars 33. Attached to the gear wheel 30 or connected to move therewith is the relatively large gear wheel 36 which in turn meshes with the gear wheel 16 on the shaft 12. It will thus be seen that a rotation of the shaft 12 will cause a rotation of the gear wheel 36, this in turn will rotate the pinion 30 which gearing with the gear wheel 29 will cause a rotation of the shaft 13, thus winding up the conveyer upon the reel. The lower ends of the supporting bars 33 are provided with the slots 35 before described, and it will be seen that these slots are oppositely placed to the slots 36 in the supporting bars 25. Therefore, when the eccentrics 20 and 21 are turned, the supporting bars 33 will not be affected, in other words, the shaft 18 will have free vertical movement in the bars 33, and this vertical movement will act to raise or lower the gear wheel 29 into or out of engagement with the pinion 30, thus connecting or disconnecting the gear wheel 29 from the pinion 30.

It will be obvious also that my construction permits either the distributer shaft 12 or the winding or reel shaft 18 to be disconnected from the driving mechanism. Under ordinary circumstances the distributer will operate in conjunction with the reel shaft, but it is obvious that this need not be the case if for any special reason it is desired to operate the distributer without the conveyer or the conveyer without the distributer.

It will also be obvious that when both of the eccentrics are turned so as to relatively depress the shaft 18, that the reel of the shaft will move freely, being entirely disconnected from any gearing.

In order to provide for an automatic disconnecting operation between the beater or distributer shaft and the driving mechanism, I provide the eccentrics 20 and 21 each with an upwardly and forwardly projecting handle 38 which is of a length sufficient to project up above the upper edges of the side boards of the wagon and which are adapted to be supported in notches 39 formed in the upper ends of the angle irons 3 on their outside edges.

The conveyer by which the manure or other material is moved from the front of the wagon to the rear thereof, consists of the oppositely disposed divergent cables 40 connected at intervals by cross bars 41, which cables are fastened at their forward ends to a feeding board 43 which extends upward to a point just above the side boards of the wagon, this feeding board being provided at its upper edge with the outwardly extending wings 44 which extend over the upper edges of the side boards of the wagon. In such position when the feeding board has been drawn to the rear of the wagon, the wings 44 will contact with the levers 38 and the curved front edges of said wings will act to force said levers laterally out of engagement with the notches 39 and hence said levers will fall. When the levers fall they will rotate the eccentrics 20 and 21 and thus the shaft 18 will be lowered, disconnecting the gear wheel 27 from the gear wheel 15, thus disconnecting the sprocket wheel 28 from the shaft 12. As soon as this occurs it will be obvious that the mechanism will be stopped. At the same time the gear 29 will be disconnected from the pinion 30 and thus the reel shaft 18 will be free from engagement with any gears, permitting the conveyer to be drawn forward into the body of the wagon if desired. While it is, of course, necessary that the feeding and distributing mechanism should practically stop when the feed board has arrived at the rear end of the wagon, I have also provided means for disconnecting the lever 38 from its engagement in the notches 39, said means to be operated by hand. As shown, the device consists of a rod 45 which is supported in suitable guides upon the side board of the wagon and which is attached to a lever 46 mounted adjacent to the driver's seat. The rear end of the rod 45 is so formed as to wedge between the lever 38 and the side of the wagon and force the lever 38 laterally outward and out of engagement with the notches, as before described. It will be understood, however, that I do not wish to limit myself to any special means for manually operating the levers 38, and it will also be plain that I need not use any means extending forward to the front of the wagon, as the levers 38 themselves can be manually operated so as to disconnect the driven gears from each other at any desired time.

In order that the traction wheels of the wagon may travel properly in muddy ground, I have provided detachable gripping clips or shoes 46 which are attachable to the rim of any ordinary wagon and held in place thereon by a U-shaped bolt and clip. This device comprises the U-shaped iron 46 having the outwardly extending ends, the U-shaped bolt 47 which passes over the base of the iron and which passes through a transverse bar 48 and is held thereto by nuts 49. By the use of these devices an ordinary wagon wheel may be formed with projections which will engage with the mud and so prevent the wheel from slipping. It will be obvious that in devices of this character, it is very necessary that the rear traction wheels shall not slip, as otherwise the proper distribution and feeding of the material would be prevented.

While I might embody the principles of my invention in other forms and modify the details thereof without departing from the spirit of the invention, I regard the construction shown as being a preferable form for the reason that the several elements of the construction may be readily disassembled and as readily assembled, thus providing a device which is extremely portable, which may be easily freighted and which provides a construction adjustable to any ordinary wagon and which may be easily removed therefrom and either stored in its set up form or disassembled and stored. The parts being separate from each other, are readily replaceable in case any parts become broken and hence the machine does not have to be thrown away if one of the parts should become damaged.

Referring to Fig. 9, it will be seen that the conveyer cables 40, as they are wound upon the reel 19, do not overlie previous winding, but that by reason of the divergence of the cables, they will first be wound at the middle of the reel shaft and each winding will come outside of the previous winding. Thus the conveyer tables will lie flat upon the reel shaft and there will be no bulky mass of rope on the reel shaft.

Having thus described the invention, what is claimed as new is:

1. A distributing mechanism for wagons, including a shiftable winding shaft, a beater shaft, a power driven gear wheel, a gear wheel on the beater shaft meshing with the first-named gear wheel, and means for shifting the winding shaft to carry the gear wheels out of mesh with each other.

2. A distributing mechanism for wagons, including a shiftable winding shaft, a conveyer operated by the winding shaft, a beater shaft, gearing operatively engaging the beater shaft with the winding shaft when the latter is in its normal position, means for shifting the winding shaft to disconnect it from engagement with the beater shaft, and means carried by the conveyer for automatically operating said shifting means when the conveyer has reached the limit of its rearward movement.

3. In a distributing mechanism for wagons, a beater shaft, a shiftable winding shaft, a power driven gear wheel connected to the winding shaft to shift therewith, a gear wheel on the beater shaft with which the first-named gear wheel meshes in its normal position, and gearing supported from the beater shaft and operatively connecting the beater shaft with the winding shaft, and means for shifting the winding shaft to disconnect the power driven gear and the gear on the beater shaft, and simultaneously disconnect the gear on the winding shaft from the gears carried by the beater shaft.

4. In a distributer mechanism for wagons, a beater shaft, a shiftable winding shaft mounted below the beater shaft, a conveyer operated by the winding shaft, a power driven gear wheel shiftable by and in correspondence with the winding shaft, a gear wheel on the beater shaft with which the first-named gear wheel engages, gear wheels supported from the other end of the beater shaft and operatively engaging the winding shaft when the parts are in their normal position, and means carried by the conveyer for operating the said winding shaft shifting means when the conveyer has reached the limit of its movement in one direction.

5. In a distributing mechanism for wagons, oppositely disposed side frames, a beater shaft carried in said side frames, gear wheels on the ends thereof, a winding shaft also mounted in said side frames, but shiftable therein, supports rigidly mounted on one end of said winding shaft, but having sliding engagement with the beater shaft, a power operated gear wheel mounted in said supports and engaging in one position of the winding shaft with the gear wheel on the beater shaft, supports extending downward from the other end of said beater shaft with the lower end of which the winding shaft has sliding engagement, a gear wheel on the end of the beater shaft, a train of gear wheels carried on said last named supports, a gear wheel on the winding shaft engaging with said train of gear wheels when the winding shaft is lifted, means for shifting said winding shaft from its normal position to disconnect the power operated gear from the gear on the beater shaft and to simultaneously disconnect the winding shaft from the train of gears, a conveyer operated by the winding shaft, and means on the conveyer for operating said winding shaft shifting means when the conveyer has reached its rearmost position.

6. A distributing mechanism for a wagon, including two oppositely disposed frames, the upper ends of said frames being inwardly extended and hooked to engage over the sides of the wagon, said frames being forwardly extended at their lower ends, a bolt passing through said forwardly extending ends and adapted to engage beneath a wagon body, a beater shaft mounted in bearings in the upper portion of said frames and projecting out from either side thereof, a winding shaft carried in the lower portions of said frames, means for raising and lowering the winding shaft, supports mounted on the winding shaft and extending upward therefrom to the beater shaft with which the beater shaft has sliding engagement, a sprocket wheel mounted in said supports, a gear wheel rotatable with the sprocket wheel, a gear wheel on the beater shaft with which said first-named gear wheel engages when the winding shaft and supports are raised, a gear wheel on the opposite end of the beater shaft, supports depending from said winding shaft, a train of gear wheels carried upon said supports, said supports having sliding engagement at their lower ends with the winding shaft, a gear wheel on the winding shaft engaging said train of gear wheels when the winding shaft is raised, eccentrics for raising and lowering the winding shaft and engaging said side frames, arms extending upwardly and forwardly from the eccentrics to a point above the side of the wagon, conveyer cables attached to the winding shaft and extending into the wagon, a feed board on the ends of the conveyer, and outwardly projecting members on the upper edge of the feed board adapted, when the conveyer has reached its rearmost position, to engage the said eccentric arms and release them, thus permitting said arms to fall and turning the eccentrics to lower the winding shaft.

In testimony whereof I affix my signature in presence of two witnesses.

PHILIP L. FORTIN. [L. S.]

Witnesses:
 FRANK FORTIN,
 EDWARD GAGNON.